United States Patent [19]

Benson et al.

[11] Patent Number: 5,181,752

[45] Date of Patent: Jan. 26, 1993

[54] PIPE FITTING WITH SWAGE RING LOCKING MECHANISM

[75] Inventors: Robert W. Benson, San Carlos; Mark J. Beiley, Daly City; Sohel A. Sareshwala, San Leandro; Steven T. Croft, Atherton; Jack M. Vaughn, Sunnyvale, all of Calif.

[73] Assignee: Lokring Corporation, Foster City, Calif.

[21] Appl. No.: 544,179

[22] Filed: Jun. 26, 1990

[51] Int. Cl.$^5$ .............................................. F16L 35/00
[52] U.S. Cl. ........................................ 285/81; 285/94; 285/328; 285/382.2; 285/417
[58] Field of Search ................ 285/382.2, 921, 328, 285/94, 417, 322, 323, 81

[56] References Cited

U.S. PATENT DOCUMENTS

| | | | |
|---|---|---|---|
| 3,262,721 | 7/1966 | Knight | 285/921 X |
| 3,827,727 | 8/1974 | Moebius | 285/382.2 X |
| 3,893,720 | 7/1975 | Moebius | 285/382.2 X |
| 3,997,195 | 12/1976 | Bartholomew | 285/81 |
| 4,061,367 | 12/1977 | Moebius | 285/382.2 |
| 4,183,560 | 1/1980 | Wyss | 285/328 X |
| 4,470,575 | 9/1984 | Stoll | 285/322 X |
| 4,482,174 | 11/1984 | Puri | 285/382.2 |
| 4,705,302 | 11/1987 | Beiley | 285/382.2 X |
| 4,903,995 | 2/1990 | Blenkush | 285/81 X |

FOREIGN PATENT DOCUMENTS 2401505  7/1975  Fed. Rep. of Germany ...... 285/322

Primary Examiner—Dave W. Arola
Attorney, Agent, or Firm—Fliesler, Dubb, Meyer & Lovejoy

[57] ABSTRACT

A pipe fitting 20 adapted for joining pipe 28, 30 comprises a swage ring 22, 24, 52 with a locking mechanism area 42, 63 which can lockingly engage with either a coupling body 26 and/or a pipe 28, 30, 56 which has a locking mechanism 44, 64 in order to prevent relative motion between the swage ring 22, 24 and the coupling body 26 and/or the swage ring 52 and the pipe 56. Such an arrangement prevents the swage ring 22, 24 from backing off of the fitting 20 should the fitting 20 be subject to flexing due to bending forces.

28 Claims, 10 Drawing Sheets

FIG.—1

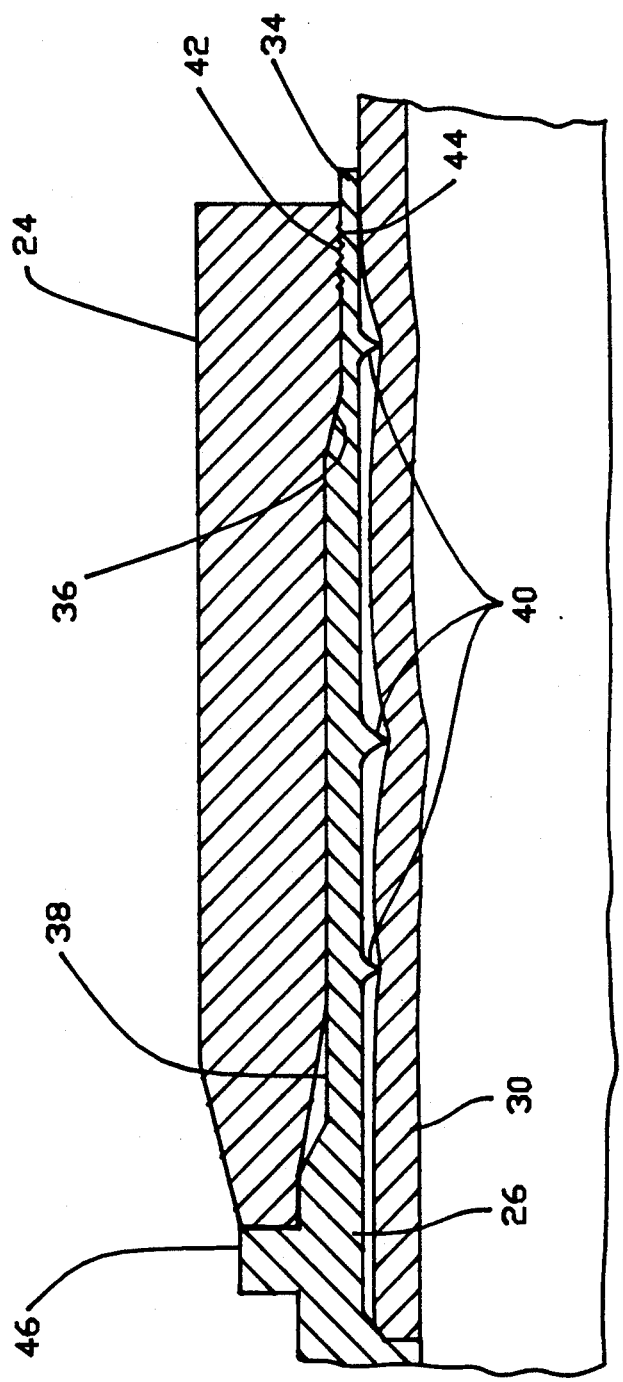
FIG.—3

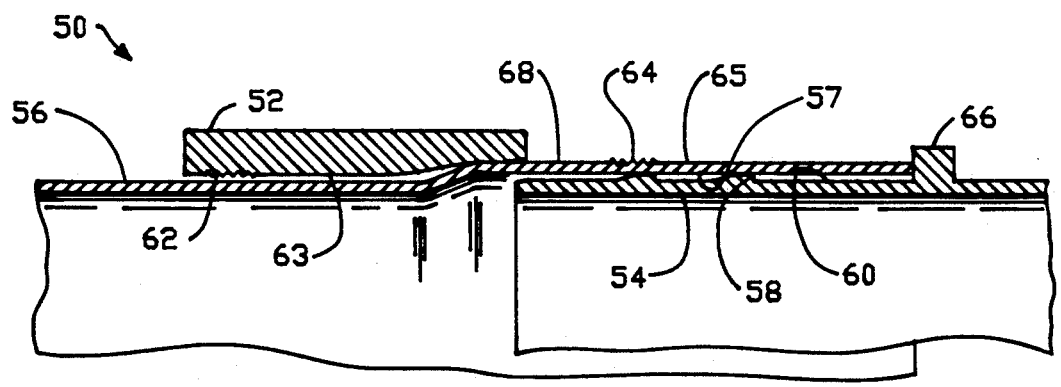
FIG.—4
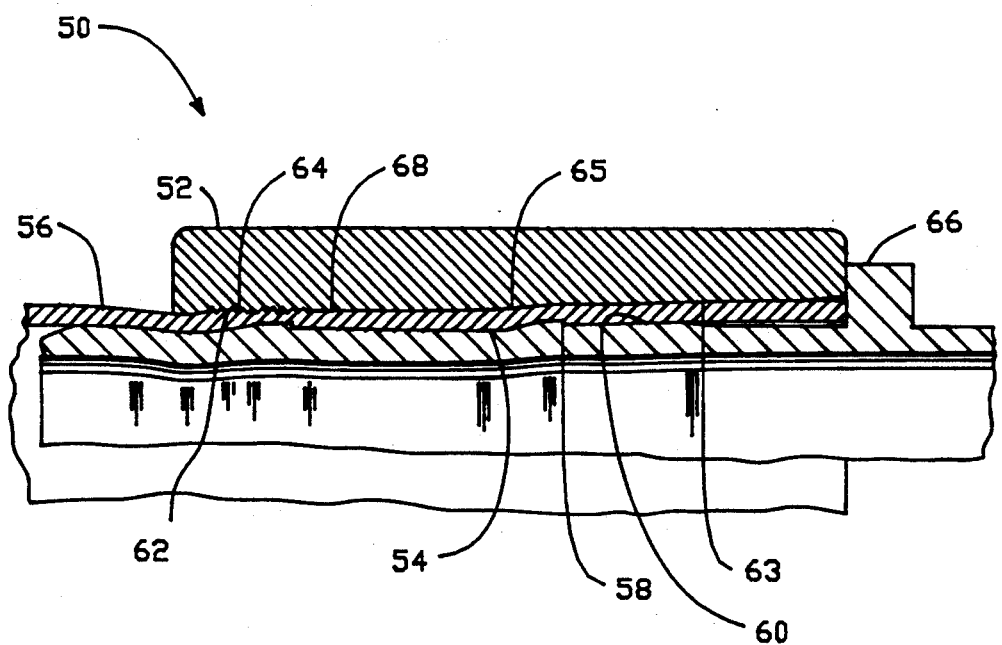
FIG.—5

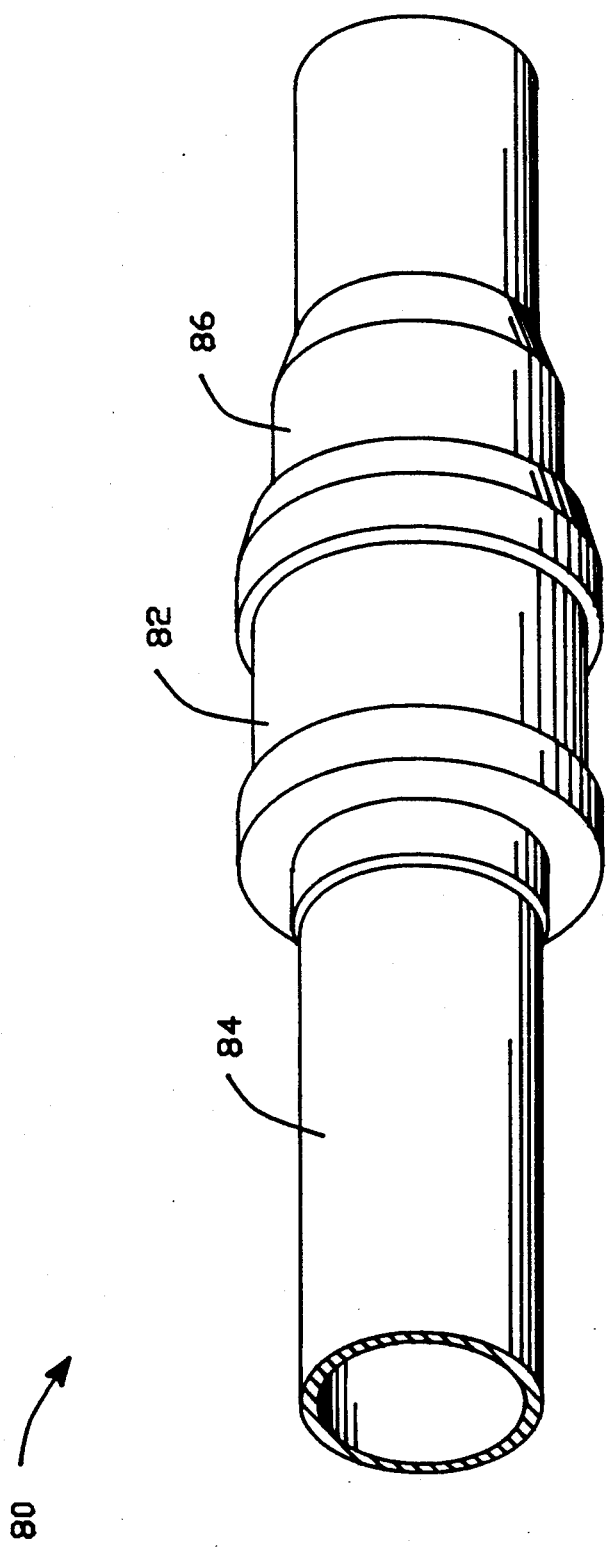
FIG.—6

PIPE FITTING WITH SWAGE RING LOCKING MECHANISM

FIELD OF THE INVENTION

The present invention is directed to a pipe fitting which allows pipes to be joined and sealed together with a mechanical fitting.

BACKGROUND OF THE INVENTION

Pipe fittings of all types are susceptible to and must withstand bending which occurs along the length of the pipes being joined. Ideally, the pipe fittings are of sufficient strength that any bending which occurs would occur in the pipe, away from the fitting so that the seal formed by the fitting would remain uncompromised.

SUMMARY OF THE INVENTION

The present invention is directed to improving upon the prior art and comprises a locking mechanism for preventing a swage ring from backing off of a coupling body and/or a pipe.

With repeated cyclical bending loads, it may be possible for the swage ring to back off of a coupling body. This backing off of the swage ring can occur with contact between a stop flange of the coupling body and the swage ring each time bending occurs. This contact pushes the swage ring away from the flange and out of effective engagement with the rest of the coupling body. In addition, as the swage ring has an inside surface with a tapered section for compressing the coupling body about the pipe, during bending the adjacent portion of the coupling body pushing on the tapered section places a resultant outward axial force on the swage ring that adds to the force that may cause the swage ring to back off of the coupling body. The same type of resultant outward axial force could occur in embodiment wherein the swage ring is urged over and in contact with a pipe in order to create a seal with a coupling body which is at least partially received in the pipe.

Prior devices solve the problem of swage ring retention by relying on elastic expansion of an exposed end of the coupling body which is just behind the trailing end of the swage ring to provide locking interference with the trailing end of the swage ring.

Thus, it is an object of the present invention to provide a locking mechanism which ensures that a swage ring does not back off of a coupling body when bending forces are placed on the pipe fitting.

It is another object of the present invention to provide a pipe fitting to ensure that a swage ring does not back off of a pipe when bending forces are placed on the pipe.

It is a further object of the present invention to provide a roughened area on the swage ring which engages a roughened area on the coupling body in order to lockingly engage the swage ring to the coupling body, ensuring that the swage ring cannot be backed off of the coupling body.

Another object of the present invention is to provide a roughened surface on a swage ring and a roughened surface on a pipe so that when pipes are joined together with the fitting, the two roughened surfaces are lockingly engaged to prevent the swage ring from backing off of the pipe.

It is still a further object of the present invention to provide a roughened area in the form of fine threads and/or annular groove that can be lockingly engaged with each other.

It is another object of the present invention to provide a detent groove on the coupling body which expands after the swage ring is urged over the coupling body in order to engage a trailing edge of the swage ring, locking the swage ring on the coupling body.

It is yet another object of the present invention to provide a detent ridge which serves substantially the same function as the detent groove.

It is still a further object of the present invention to provide a detent groove on the swage ring which can cooperate with either the detent groove or the detent ridge on the coupling body in order to lock position the swage ring on the coupling body.

It is a further object of the present invention to provide a portion of the ring inner surface with a coating of lubrication in order to ease the forces required to urge the swage ring over the coupling body, a lubrication provided on a portion of the ring inner surface unassociated with the locking mechanism.

It still a further object of the present invention to have the locking mechanism defined by a galling area designed on the ring inner surface, which galling area is sufficiently large so that with the swage ring urged over the coupling body in order to create a seal with a pipe, the galling area contacts and is cold welded to the coupling body.

In one aspect of the invention, a pipe fitting is adapted to be joined to a pipe and comprises a coupling body with a body inner surface adapted for receiving a pipe and a body outer surface. The pipe fitting further includes a swage ring which defines a ring inner surface which ring inner surface is urgeable over the body outer surface in order to cause at least part of the body inner surface to engage the pipe to create a seal. Further, the invention includes a locking mechanism such that with the swage ring urged over the coupling body in order to create a seal with the pipe, the locking mechanism prevents relative motion between the coupling body and the swage ring.

In another aspect of the present invention, a pipe fitting is adapted to be joined to a pipe, which pipe has a pipe outer surface and a pipe inner surface. The pipe fitting comprises a coupling body with a body outer surface adapted for receiving a pipe with a pipe inner surface located adjacent the body outer surface. A swage ring is provided which defines a ring inner surface, which ring inner surface is engageable over the pipe outer surface in order to cause the body outer surface to engage the pipe to create a seal. The invention further includes a locking mechanism such that with the swage ring urged over the pipe in order to create a seal with the coupling body, the locking mechanism prevents relative motion between the pipe and the swage ring.

In a further aspect of the invention, an apparatus is provided for joining the ends of a pair of interfitting pipes, when an end portion of the first pipe lies within the an end portion of a second pipe, with the end portion of the second pipe defining a pipe outer surface. The apparatus includes a swage ring which defines a ring inner surface, which ring inner surface is urgeable over the pipe outer surface in order to cause the first pipe to engage the second pipe to create a seal. The invention further includes a locking mechanism such that with the swage ring urged over the second pipe in order to create a seal with the first pipe, the locking mechanism prevents relative motion between the second pipe and the swage ring.

BRIEF DESCRIPTION OF THE FIGURES

FIG. 3 depicts a cross-sectional view of an embodiment of the invention of FIG. 2 with the swage ring urged over the coupling body.

FIG. 4 depicts a cross-sectional view of an alternative embodiment of the invention with a swage ring positioned relative to a pipe and a coupling body before the swage ring has been urged into a locking position.

FIG. 5 depicts a cross-sectional view of the embodiment of FIG. 4 with the swage ring urged over the pipe and coupling body into a locking position.

FIG. 6 depicts a prospective view of a pipe fitting using another embodiment of the present invention.

DETAILED DESCRIPTION OF THE PREFERRED EMBODIMENT

The present invention relates to pipe fittings such as pipe fittings depicted and described in the following United States Patents and Patent Application, which patents and patent application are incorporated herein by reference. These patents and patent application include the following:

1. U.S. Pat. No. 4,061,367, issued on Dec. 6, 1977 entitled "LOCKRING TUBE JOINT".

2. U.S. Pat. No. 4,482,174, issued on Nov. 13, 1984 and entitled "APPARATUS AND METHOD FOR MAKING A TUBE CONNECTION".

3. U.S. Pat. No. 4,858,968, issued on Aug. 22, 1989 and entitled "LOCKRING TUBE JOINT".

4. U.S. patent application Ser. No. 07/497,505, filed on Mar. 22, 1990 and entitled "PIPE FITTING WITH IMPROVED COUPLING BODY" which has matured into U.S. Pat. No. 5,110,163 issued on May 5, 1992.

Figure 1:
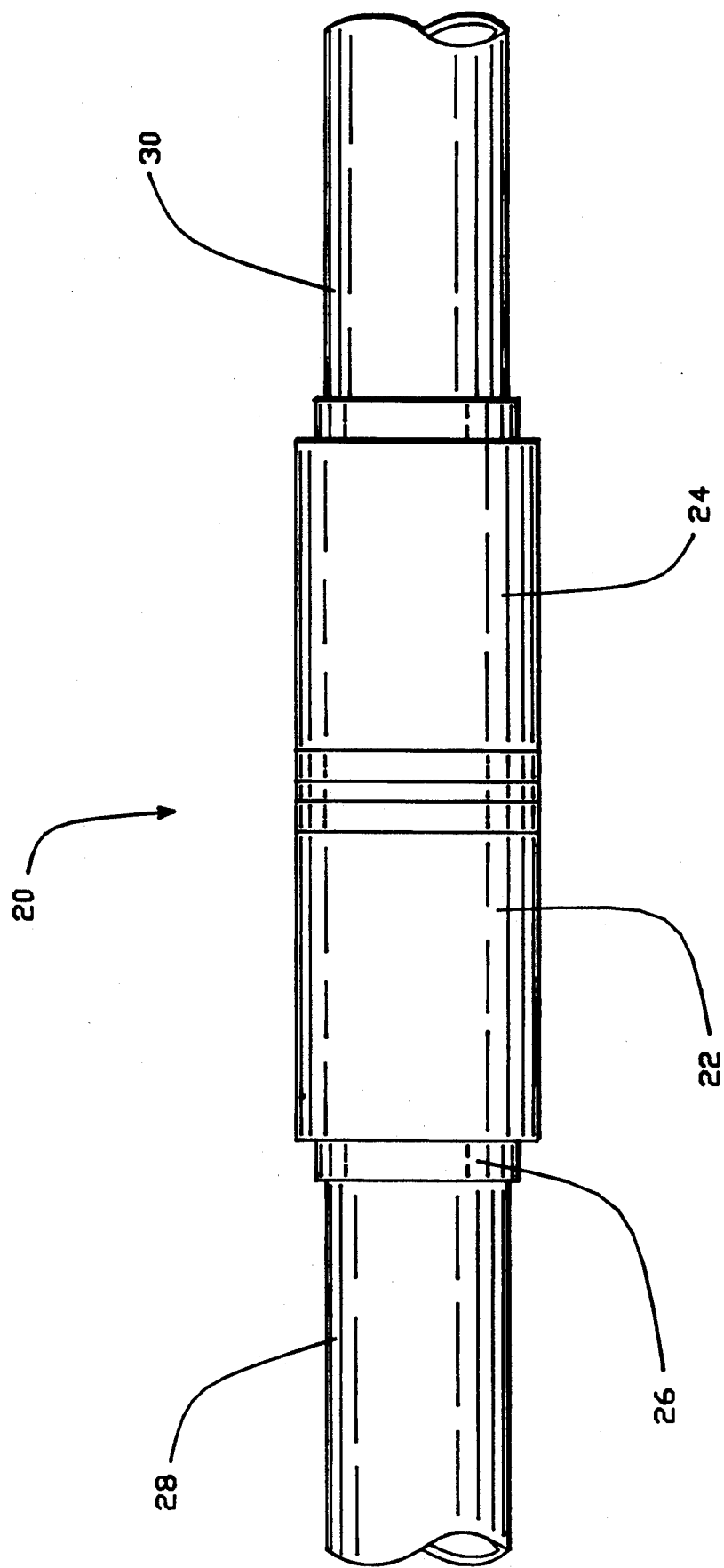
FIG. 1 is a plan view of a pipe fitting using an embodiment of the invention.

With reference to the figures and in particular to FIG. 1, an embodiment of the pipe fitting 20 of the invention is depicted. Pipe fitting 20 includes in this particular embodiment, first and second swage rings 22, 24 which are urged over a coupling body 26 in order to secure together in a hermetically sealed manner, first and second pipes 28, 30. It is noted that the pipe fittings of the invention can be used equally well with pipes, tubes and/or other conduits and such pipes, tubes and-/or other conduits shall be collectively referred to as pipes, herein. Further, it is noted that while a preferred embodiment is discussed with respect to an arrangement wherein two pipes are joined together with a pipe fitting such as pipe fitting 20, other embodiments can include an arrangement where the pipe fitting is previously secured to a pipe in a conventional manner, such as by welding, such that only one swage ring, such as swage ring 24, is required to seal a separate pipe to the pipe fitting. Such arrangements can also include "T" joints, elbows and the like wherein one or more of the connections is accomplished in accordance with the invention and the other connections are accomplished conventionally by welding and the like.

Further, it is to be understood that the coupling body can be constructed of any malleable metal such as aluminum, steel, copper and the like whereas the swage rings are generally constructed of a metal of equal or higher strength. Further, the coupling body and swage rings can also be comprised of, by way of example only, plastic materials, polymers, and composite materials having various fibers and filaments therein.

Figure 2:
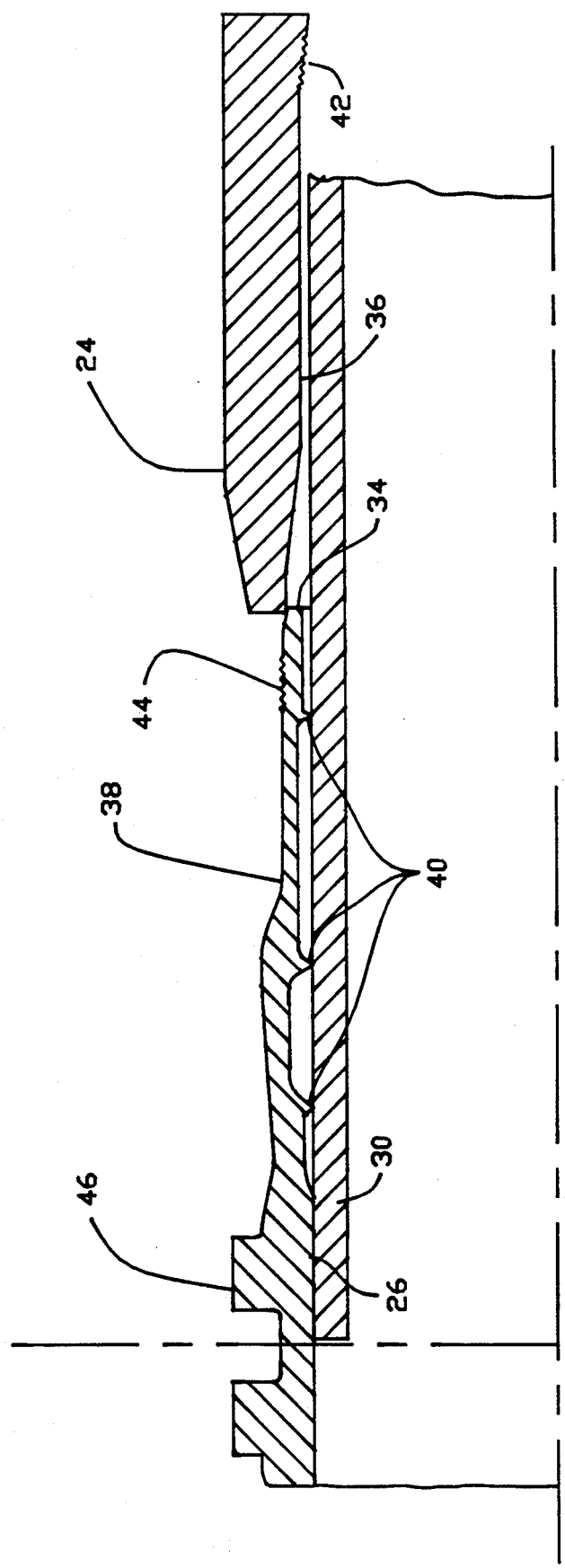
FIG. 2 depicts a cross-sectional view of an embodiment of the invention in FIG. 1.

FIG. 2 depicts a cross-sectional view of a portion of the coupling body 26 with the pipe 30 disposed therein and with the swage ring 24 positioned adjacent the end 34 of the coupling body 26 prior to the swage ring 24 being urged into engagement with the coupling body 26. As can be seen in FIG. 2, the inner surface 36 of the swage ring 34 is urged into engagement with the outer surface 38 of the coupling body 26 in order to cause the teeth 40 to bite into the pipe 30 creating a seal. The dimensions of the teeth 40 are more fully described in U.S. Pat. No. 5,110,163. As demonstrated in FIG. 3, in order to lockingly engage the swage ring 24 onto the coupling body 26 in the position shown, the present invention defines on the inner surface 36 of the swage ring 24 a roughened or irregular surface area 42 and on the outer surface of the coupling body 26 a roughened or irregular surface area 44. In a preferred embodiment, both roughened areas 42, 44 can be comprised of a plurality of fine threads or annular grooves or ridges which are machined into the surfaces 36, 38. Additionally, other manufacturing processes, including by way of example only, milling, galling, etching, broaching, reaming, grinding and other manufacturing steps can be used to provide the desired roughened area.

Further, it is to be understood that in a preferred embodiment, the roughened area has an average arithmetical roughness of between 64 to 128 microinches or coarser and the remaining surfaces 36, 38 of the swage ring 24, and the coupling body 26, respectively, have an average arithmetical roughness of between 16 to 32 microinches or finer. The term "arithmetical average roughness" means arithmetical average deviations from a mean surface Where the term "mean surface" refers to the prefect surface that would be formed if all the roughness peaks were cut off and used up in just filling in the valleys below the mean surface. An arithmetical average deviation from the mean surface is obtained by an instrument which, in effect, takes a great many measurements of the heights of the peaks and valleys of the surface (measured from the mean surface) and averages them.

It is to be understood that for purposes of quality control and repeatability, that in a preferred embodiment, the roughened areas 42, 44 will be comprised of fine threads so that the roughness can be repeated from fitting to fitting.

In theory, it is to be understood that the roughened surfaces are rough enough to have the desired effect of preventing the swage ring from backing off of the coupling body yet are not so rough as to unduly increase the assembly force required to urge the swage ring over the coupling body. Additionally, the roughened surfaces are designed to be easy to fabricate as for example, the threads are machinable with just one pass with the appropriate machine over the coupling body and swage ring.

It is to be understood that although the roughened areas 42, 44 are shown adjacent the trailing edge of the swage ring and the leading edge of the coupling body, that the roughened surfaces can be placed anywhere along the swage ring and the coupling body so long as when the swage ring is fully seated on the coupling body, the roughened areas 42, 44 will be lockingly engaged to lock the swage ring onto the coupling body.

With such locking engagement, should there be bending forces placed on the fitting such that the stop flange 46 is urged against the swage ring 24, the locking engagement of the roughened areas 42, 42 will resist such urging in order to prevent relative motion between the coupling body 26 and the swage ring 24, preserving the integrity of the seal.

Another embodiment of the invention can be seen in FIGS. 4 and 5. In these figures, the pipe fitting 50 includes a swage ring 52 and a coupling body 54. In the embodiments of FIGS. 4 and 5, the end 68 of the pipe 56 is flared and fits over the coupling body 54 so that teeth 58 on the outer surface 60 of the coupling body 54 can engage with the inner surface 57 of the pipe 56. In this embodiment, a roughened or irregular surface area 62 is provided on the inner surface 63 of the swage ring 52 in much the same manner as it is provided on the swage ring of the prior embodiment. A mating roughened or irregular surface area 64 is also provided on the outer surface 65 of the pipe 56. FIG. 5 depicts the swage ring 52 urged over the pipe 56 and coupling body 54 into contact with the stop flange 66 of the coupling body 54 in order to create a seal between the pipe and the coupling body. In this configuration, the roughened surfaces 62, 64 lockingly engage each other in order to lockingly position the swage ring 52 relative to the pipe 56.

Another embodiment similar to FIGS. 4 and 5 can use a similar arrangement without the end of the pipe being so flared.

Figure 7:
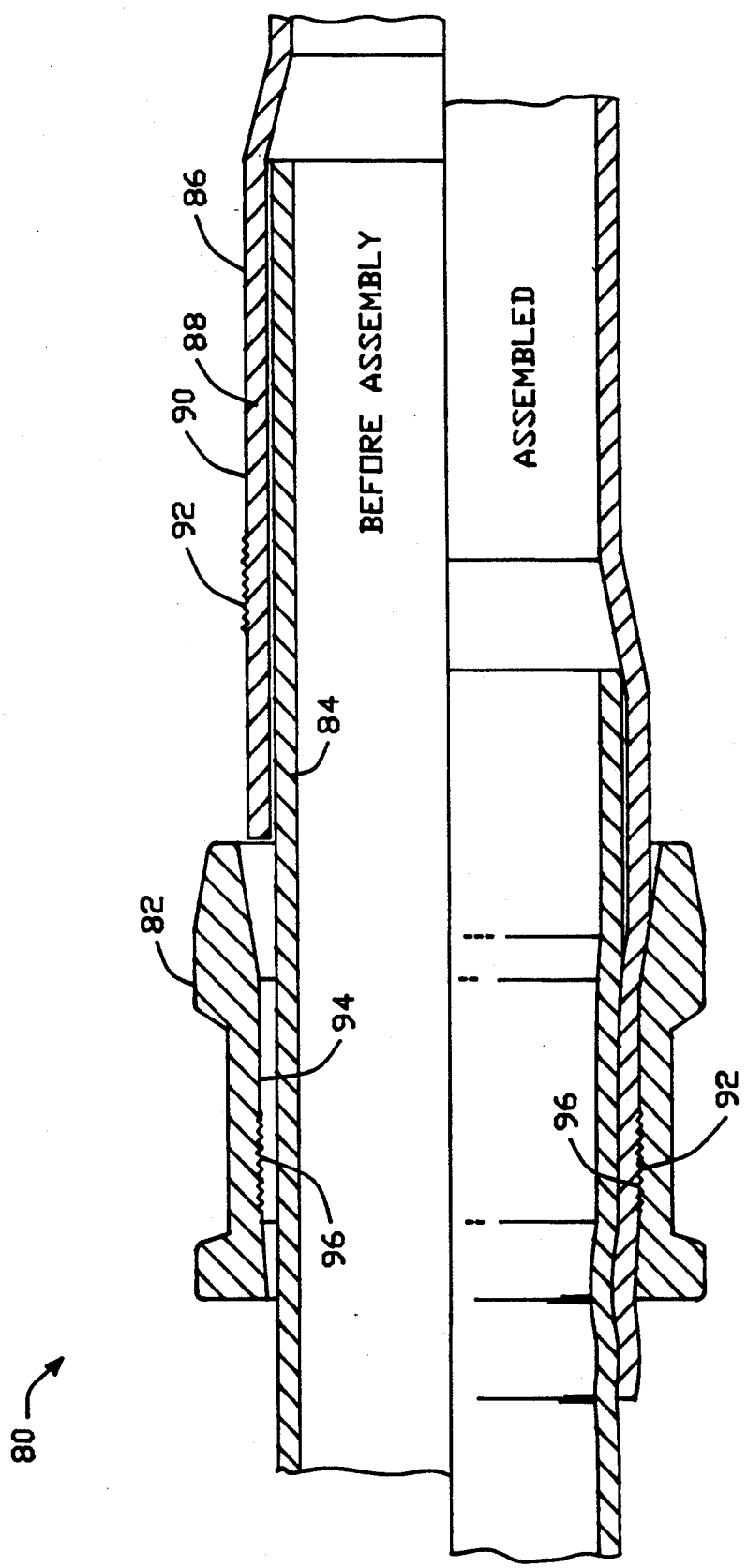
FIG. 7 depicts the embodiment of the invention of FIG. 6, and in part shows a swage ring before it engages a piping and in part shows a swage ring after it has engaged the pipe, as depicted in FIG. 6.

A further embodiment of the present invention is depicted in FIGS. 6 and 7. This pipe fitting 80 includes a single swage ring 82 which is used to assemble together a first pipe 84 and a second pipe 86 which has a flared end 88 into which is received the end of the first pipe 84. The swage ring 82 is then urgeable over the end 88 of the second pipe 86 in order to deform pipes 84, 86 in such a manner that a seal is formed between pipes 84, 86.

The outer surface 90 of the flared end 88 of the pipe 86 has a roughened and/or irregular surface area 92 which can be provided on the pipe in much the same manner as the other above discussed roughened areas are provided. The inner surface 94 of the swage ring 82 includes a roughened and/or irregular surface area 96 which can be provided as described hereinabove with respect to the other roughened areas. Accordingly, when the swage ring 82 is urged over the second pipe 86 so that a sealing arrangement is formed between the pipes 84, 86 roughened area 92 lockingly engages with the roughened area 96 in order to lockingly engage the swage ring 82 onto the pipe 86 with all the advantages of such locking engagement as described herein.

It is to be understood that an embodiment using the plurality of fine interlocking grooves, threads or ridges in both the swage ring and the coupling body is preferred as these grooves, ridges or threads can be produced as part of the machining process with a specially shaped cutting tool on the lathe so that each pass of the tool creates a tooth. This approach creates the distinct advantage in that it does not require that the pipe expand, after it has been compressed by the swage ring, more than a few thousandths of an inch. This embodiment thus does not pose an impediment to the creation of a series of pipe deformations made by a main seal tooth, an isolation tooth and an inboard tooth, which deformations are required to produce a tight, durable seal.

Further, it is to be understood that this embodiment is preferred in comparison to the other embodiments of the present invention and that in the other embodiments, the grooves, ridges and projections are machined to certain tolerances which may allow for some finite measure of movement of the swage ring with respect to the coupling body should bending forces be placed on the pipe fitting. With the use of interlocking fine threads, ridges or grooves, such movement is eliminated due to the more close tolerances of the fine threads, ridges or grooves.

Other embodiments of the invention are presented in FIGS. 8 to 14.

Figure 8:
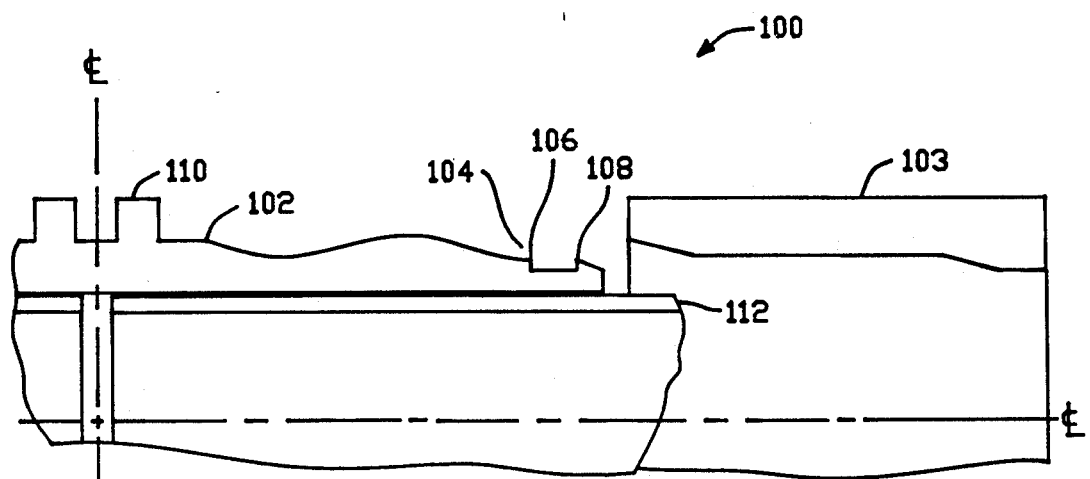
FIG. 8 depicts a cross-sectional view of another alternative of the invention with the coupling body defining a detent groove.
Figure 9:
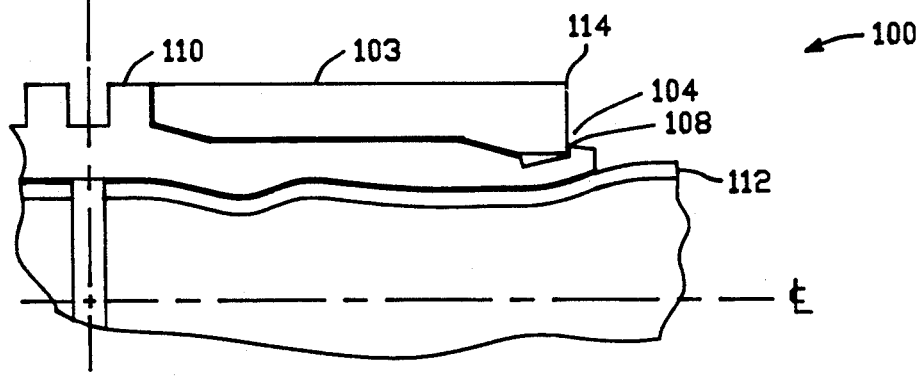
FIG. 9 depicts a cross-sectional view of the alternative embodiment of FIG. 8 with the driver urged over the coupling body into engagement with the detent groove.

In the pipe fitting 100, depicted in FIG. 8, the coupling body 102 includes a detent groove 104. Detent groove 104 is circumferentially disclosed about the coupling body and is defined by sharp edges 106, 108. As can be seen in FIG. 9, with the swage ring 103 urged over the coupling body 102 into contact with the stop flange 110 in order to create a seal between coupling body 102 and the pipe 112, the trailing edge 114 of the swage ring 103 engages the edge 108 of groove 104 in order to lockingly position the swage ring 103 between the stop flange 110 and the edge 108 of the detent groove 104.

It is to be understood that as the swage ring 103 passes over the detent groove 104, the portion of the exposed coupling body 103 and the pipe 112 adjacent the detent groove 104 and outboard thereof elastically expands, allowing edge 108 to engage the trailing edge 114 of the coupling body 102. This expansion is an elastic reversal of the compression caused as the swage ring is driven over the coupling body.

In such an embodiment, should bending forces be placed on the pipe fitting 100 so as to cause the stop flange 110 to be urged against the swage ring 103, the detent groove 104 prevents the swage ring 103 from being urged backwardly off of the coupling body 102.

Figure 10:
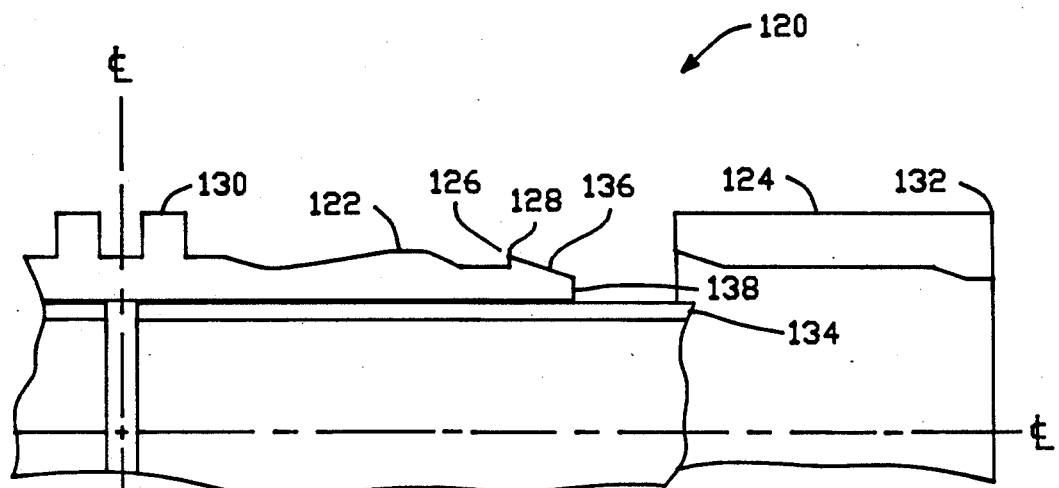
FIG. 10 depicts another embodiment of the invention with the coupling body defining a detent ridge.
Figure 11:
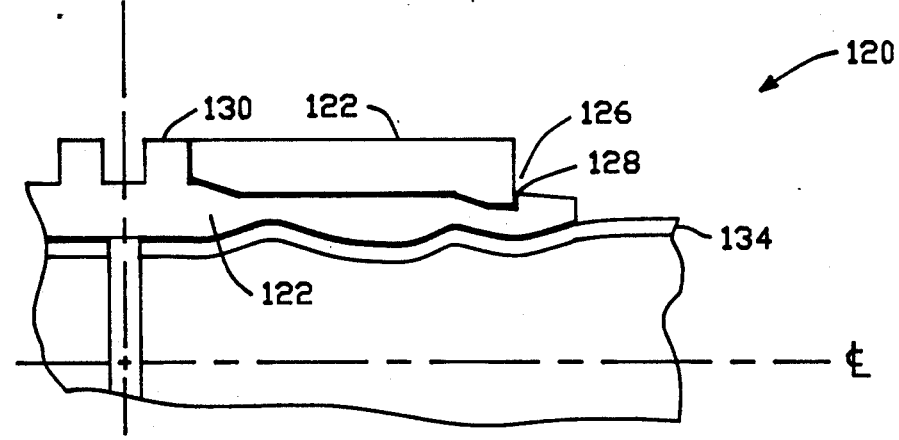
FIG. 11 depicts a cross-sectional view of the embodiment of FIG. 10 with the swage ring urged over the coupling body into engagement with the detent ridge.

Another embodiment of the present invention is depicted in FIGS. 10 and 11. In FIG. 10 the pipe fitting 120 defines a coupling body 122 and a swage ring 124.

The coupling body 122 defines a circumferential detent ridge 126 which has a sharp edge 128 which faces the stop flange 130. The swage ring 124 includes a trailing edge 132. It is noted that the detent ridge 126 has a gently sloping ramp 136 which gradually increases in height from the edge 138 of the coupling body to the sharp edge 128 of the detent ridge 126.

As with the embodiment of FIGS. 8 and 9, in the embodiments of FIGS. 10 and 11, as the swage ring 124 is urged over the coupling body 122 into contact with the stop flange 130, the sharp edge 128 comes into to locking engagement with the trailing edge 132 of the swage ring 124 in order to lockingly position the swage ring 124 on the coupling body 122 between the stop flange 130 and the edge 128 of the detent ridge 126. Again, as the swage ring 124 passes over the detent ridge 126, the detent ridge 126 and the pipe 134 adjacent thereto elastically expand causing the detent ridge 126 to engage the trailing edge 132 of the swage ring 124.

Figure 12:
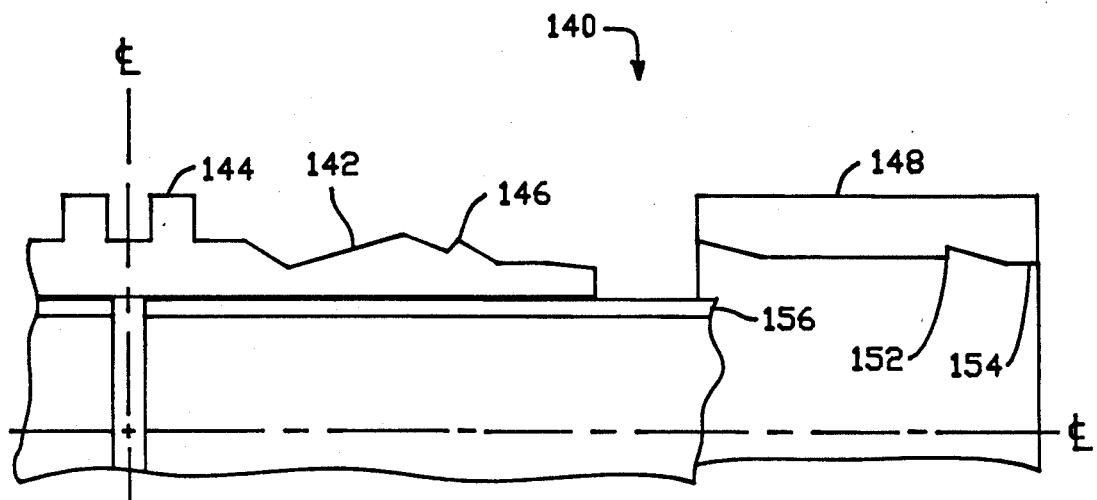
FIG. 12 depicts yet another embodiment of the present invention wherein the swage ring defines a detent groove which is mateable with a detent of the coupling body.
Figure 13:
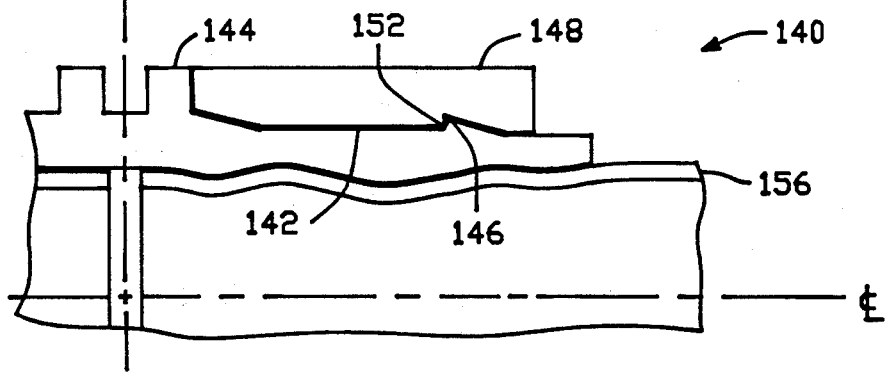
FIG. 13 depicts the embodiment of FIG. 12 with the swage ring urged over the coupling body with the detent engaging the detent groove.

In a further embodiment of the present invention is depicted in FIGS. 12 and 13. In this embodiment, the pipe fitting 140 includes a coupling body 142 which has a stop flange 144 and a detent 146. The pipe fitting 140 further includes a swage ring 148 which defines a detent groove 150. Detent groove 150 includes a sharp edge 152 which faces the trailing edge 154 of the swage ring 148. The configuration of the detent groove 150 is sufficient to allow for the elastic expansion of the pipe 156 and coupling body 142 after the detent groove 150 is positioned substantially adjacent to the detent 146 of the coupling body 142 so that locking interference can be obtained between the detent 146 of the coupling body 142 and the detent groove 150 of the swage ring 148 as shown in FIG. 13.

It is to be understood that the locking mechanism of the invention as taught in FIGS. 8 through 13 can be used in addition to or in substitution of the locking mechanisms taught in FIGS. 1 through 7.

Figure 14:
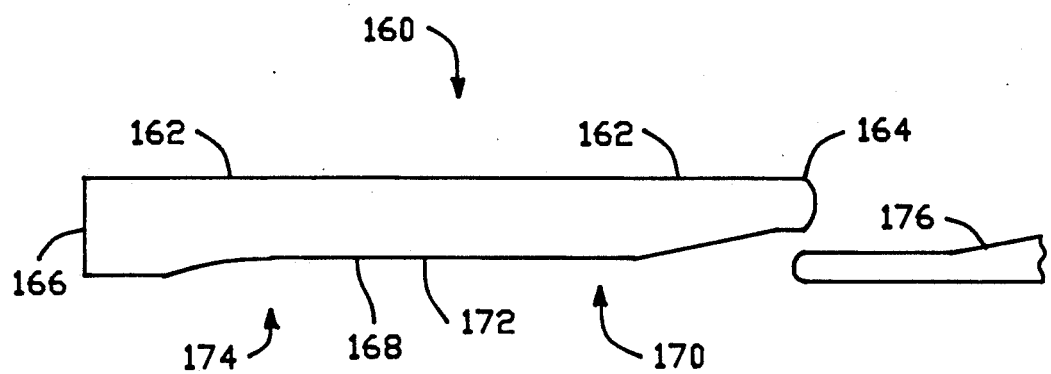
FIG. 14 is another embodiment of the invention wherein the swage ring is provided with lubrication and a galling area.

A further embodiment of the invention is shown in FIG. 14. In this embodiment, the pipe fitting 160 includes a swage ring 162 which has a front edge 164 and a trailing edge 166. The swage ring 162 includes an internal circumferential surface 168. The front portion 170 of the internal circumferential surface 168 is covered with a lubricant which, in a preferred embodiment, includes a dry film lubricant, such as for example, a molydisulfide lubricant. This lubricant extends from the leading edge 164 to about a middle portion 172 of the internal circumferential surface 168. The remaining portion of the internal circumferential surface 168 from the middle portion 172 to the trailing edge 166 is not lubricated. The lubricated front portion 170, allows for easy installation with less friction and decreased insulation force when the swage ring is urged over the coupling body in order to seal the coupling body to the pipe. The unlubricated portion provides a galling area 174 which allows for metal-to-metal contact between the internal circumferential surface 168 of the swage ring 162 and the adjacent surface of a coupling body 176 resulting in galling and cold welding. This galling or cold welding action secures the swage ring to the coupling body and prevents the swage ring from backing off or slipping off of the coupling body. This embodiment of the invention requires that the trailing edge 166 of the swage ring not be provided as a sharp knife edge and that the galling area has a sufficiently large surface area to allow for adequate galling and cold welding in order to resist any backing off forces which may be placed on the swage ring by the coupling body. Normally, pipe fittings attempt to reduce or eliminate galling and cold welding in order to facilitate low installation forces. However, in this embodiment, galling and cold welding is encouraged due to selected dimensions and tolerances in a controlled galling area in order to look the swage ring to the coupling body.

INDUSTRIAL APPLICABILITY

As is evident from the above, the present invention is useful with a variety of pipe fitting arrangement wherein one or several swage rings are urgeable relative to the pipes in order to provide a sealing arrangement. The pipe fitting includes the locking mechanism which assists in the prevention of the swage ring from being backed off from the sealing arrangement should bending forces be placed on the fitting.

Other objects and aspects of the invention can be obtained from a review of the figures and the appended claims.

It is to be understood that other embodiments of the present invention can be fabricated and come with the spirit and scope of the appended claims.

What is claimed is:

1. A pipe fitting adapted to be joined to a pipe comprising:
    a coupling body with a body inner surface adapted for receiving a pipe and a body outer surface;
    a swage ring which defines a ring inner surface, which ring inner surface is urgeable over the body outer surface in order to cause a tooth defined by the body inner surface to engage and be secured to the pipe to create a seal with the pipe positioned in the coupling body; and
    a locking means formed in said body outer surface and the ring inner surface for lockingly engaging the swage ring to the coupling body, in order to prevent relative motion between said coupling body and said swage ring, with the swage ring urged over said coupling body in order to create said seal between the coupling body and the pipe; and
    wherein said locking means includes:
    a body roughened area defined on a portion of said body outer surface;
    a ring roughened area defined on a portion of said ring inner surface; and
    said body roughened area located on said body outer surface in a portion such that with said swage ring urged over said coupling body in order to create said seal with the pipe, said body roughened area lockingly engages said ring roughened area in order to prevent relative motion between said coupling body and said swage ring;
    wherein the portion of the body outer surface on which the body roughened area is defined has a substantially uniform outer diameter along the length of the coupling body; and
    wherein both the body roughened area and the ring roughened area have an arithmetical average roughness dimension which is substantially smaller than the tooth of the body inner surface which engages and is secured to the pipe to create a seal.

2. The pipe fitting of claim 1 wherein said body roughened area of said ring roughened area have an arithmetical average roughness in the range of between about 64 and to about 128 microinches and the body outer surface and said ring inner surface have an arithmetical average roughness in the range of between about 16 to about 32 microinches.

3. The pipe fitting of claim 1 wherein said body roughened area includes a first plurality of ridges and said ring roughened area includes a second plurality of ridges.

4. The pipe fitting of claim 1 wherein said body roughened area includes a first plurality of irregularities and said ring roughened area includes a second plurality of irregularities.

5. The pipe fitting of claim 1 wherein a portion of the ring inner surface is coated with lubrication in order to lessen the force required to urge the swage ring over the coupling body, said lubrication, initially positioned on that portion of the ring inner surface unassociated with the locking mechanism.

6. The pipe fitting of claim 5 wherein said lubrication includes a dry film lubrication.

7. A pipe fitting adapted to be joined to a pipe comprising:
   a coupling body with a body outer surface adapted for receiving a pipe with the pipe inner surface located adjacent the body outer surface;
   a swage ring which defines a ring inner surface which ring inner surface is urgeable over the pipe outer surface in order to cause a tooth defined by the body outer surface to engage and be secured to the pipe to create a seal with the pipe positioned over the coupling body; and
   a locking means forming in said pipe outer surface and said ring inner surface for lockingly engaging the swage ring to the pipe, in order to prevent relative motion between the pipe and the swage ring, with the swage ring urged over the pipe in order to create the seal between the pipe and the coupling body; and
   wherein said locking means includes:
   a pipe roughened area provided on a portion of the pipe outer surface;
   a ring roughened area defined on a portion of said ring inner surface; and
   said pipe roughened area located on said pipe outer surface in a position such that with said swage ring urged over the pipe in order to create said seal with said coupling body, said pipe roughened area lockingly engages said ring roughened area in order to prevent relative motion between the pipe and said swage ring; and
   wherein the portion of the pipe outer surface on which the pipe roughened area is defined has a substantially uniform outer diameter along the length of the pipe; and
   wherein both the pipe roughened area and the ring roughened area have an arithmetical average roughness dimension which is substantially smaller than the tooth of the body outer surface which engages and is secured to the pipe to create said seal.

8. The pipe fitting of claim 7 wherein said pipe roughened area and said ring roughened area have an arithmetical average roughness in the range of between about 64 to about 128 microinches and the pipe outer surface and said ring inner surface have an arithmetical average roughness in the range of between about 16 to 32 about microinches.

9. The pipe fitting of claim 7 wherein a portion of the ring inner surface is coated with lubrication in order to lessen the force required to urge the swage ring over the coupling body, said lubrication initially positioned on that portion of the ring inner surface unassociated with the locking mechanism.

10. The pipe fitting of claim 9 wherein said lubrication includes a dry film lubrication.

11. An apparatus for joining the ends of a pair of interfitting pipes wherein an end portion of a first pipe lies within an end portion of a second pipe, with the end portion of the second pipe defining a pipe outer surface, comprising:
    a swage ring which defines a ring inner surface, which ring inner surface is urgeable over the pipe outer surface in order to cause at least part of the first pipe to engage and be secured to the second pipe to create a seal with the first pipe positioned within the second pipe; and
    a locking means formed in said pipe outer surface and said ring inner surface for lockingly engaging the swage ring to the second pipe, in order to prevent relative motion between the second pipe and the swage ring, with the swage ring urged over the second pipe in order to create the seal between the first and second pipes; and
    wherein the locking means includes:
    pipe roughened area provided on a portion of the pipe outer surface;
    a portion of said ring inner surface defining a ring roughened area; and
    said pipe roughened area located on the pipe outer surface in a position such that with said swage ring urged over said second pipe in order to create said seal with said first pipe, said body roughened area lockingly engages said ring roughened area in order to prevent relative motion between the second pipe and said swage ring; and
    wherein the portion of the pipe outer surface on which the pipe roughened area is defined has a substantially uniform outer diameter along the length of the second pipe; and
    wherein both the pipe roughened area and the ring roughened area have an arithmetical average roughness which is about several times larger than the arithmetical average roughness of the second pipe outer surface.

12. The apparatus of claim 11 wherein said pipe roughened area and said ring roughened area have an arithmetical average roughness in the range of between about 64 to about 128 microinches and the pipe outer surface and said ring inner surface have an arithmetical average roughness in the range of between about 16 to about 32 microinches.

13. The apparatus of claim 11 wherein said pipe roughened area includes a first plurality of ridges and said ring roughened area includes a second plurality of ridges.

14. The apparatus of claim 11 wherein said pipe roughened area includes a first plurality of irregularities and said ring roughened area includes a second plurality of irregularities.

15. The apparatus of claim 11 wherein said second, pipe is a coupling body.

16. A pipe fitting adapted to be joined to a pipe comprising:
    a coupling body with a body inner surface adapted for receiving a pipe and a body outer surface with a stop flange extending from the body outer surface;

a swage ring which defines a ring inner surface which ring inner surface is urgeable over the body outer surface into contact with the stop flange in order to cause a tooth defined by the body inner surface to engage and be secured to the pipe to create a seal with the pipe positioned in the coupling body; and a locking means formed in said body outer surface and the ring inner surface for lockingly engaging the swage ring to the coupling body in order to prevent the stop flange from pushing against the swage ring to cause relative motion between said coupling body and the swage ring should the pipe fitting and the pipe be flexed, with the swage ring urged over said coupling body in order to create the seal between the coupling body and the pipe; and wherein said locking means includes:

a body roughened area defined by a portion of said body outer surface;

a ring roughened area defined by a portion of said ring inner surface; and said body roughened area located on said body outer surface in a position such that with said swage ring urged over said coupling body in order to create said seal with the pipe, said body roughened area lockingly engages said ring roughened area in order to prevent the stop flange from pushing against the swage ring to cause relative motion between said coupling body and said swage ring should the pipe fitting and pipe be flexed;

wherein the portion of the body outer surface on which the body roughened area is defined has a substantially uniform outer diameter along the length of the coupling body; and wherein both the body roughened area and the ring roughened area have an arithmetical average roughness dimension which is substantially smaller than the tooth of the body inner surface which engages and is secured to the pipe to create said seal.

17. The pipe fitting of claim 16 wherein said body roughened area and said ring roughened area have an arithmetical average roughness in the range of between about 64 to about 128 microinches and the body outer surface and said ring inner surface have an arithmetical average roughness in the range of between about 16 to about 32 microinches.

18. A pipe fitting adapted to be joined to a pipe comprising:

a coupling body with a body inner surface adapted for receiving a pipe and a body outer surface;

a swage ring which defines a ring inner surface, which ring inner surface is urgeable over the body outer surface in order to cause a tooth of the body inner surface to engage and be secured to the pipe to create a seal with the pipe positioned in the coupling body; and a locking means formed in said body outer surface and the ring inner surface for lockingly engaging the swage ring to the coupling body, in order to prevent relative motion between said coupling body and said swage ring, with the swage ring urged over said coupling body in order to create said seal between the coupling body and the pipe; and wherein said locking means includes a first plurality of one of fine threads, fine grooves and fine ridges defined on a portion of the body outer surface and a second plurality of one of fine threads, fine grooves, and fine ridges defined on a portion of the ring inner surface; and wherein the portion of the body outer surface on which the locking means is defined has a substantially uniform outer diameter along the length of the coupling body; and wherein both the first and second plurality of one of fine threads, fine grooves and fine ridges have an arithmetical average roughness dimension which is substantially smaller than the tooth of the body inner surface which engages the pipe to create said seal.

19. A pipe fitting adapted to be joined to a pipe comprising:

a coupling body with a body outer surface adapted for receiving a pipe with the pipe inner surface located adjacent the body outer surface;

a swage ring which defines a ring inner surface which ring inner surface is urgeable over the pipe outer surface in order to cause a tooth of the body outer surface to engage and be secured to the pipe to create a seal with the pipe positioned over the coupling body; and a locking means formed in said pipe outer surface and said ring inner surface for lockingly engaging the swage ring to the pipe, in order to prevent relative motion between the pipe and the swage ring, with the swage ring urged over the pipe in order to create the seal between the pipe and the coupling body; and wherein said locking means includes a first plurality of one of fine threads, fine grooves, and fined ridges defined on a portion of the pipe outer surface, and a second plurality of one of fine threads, fine grooves, and fine ridges defined on a portion of the ring inner surface;

wherein the portion of the pipe outer surface on which the locking means is defined has a substantially uniform outer diameter along the length of the pipe; and wherein both the first and second plurality of one of fine threads, fine grooves and fine ridges have an arithmetical average roughness dimension which is substantially smaller than the tooth of the body outer surface which engages the pipe to create said seal.

20. An apparatus for joining the ends of a pair of interfitting pipes wherein an end portion of a first pipe lies within an end portion of a second pipe, with the end portion of the second pipe defining a pipe outer surface, comprising:

a swage ring which defines a ring inner surface, which ring inner surface is urgeable over the pipe outer surface in order to cause at least part of the first pipe to engage and be secured to the second pipe to create a seal with the first pipe positioned within the second pipe; and a locking means formed in said pipe outer surface and said ring inner surface for lockingly engaged the swage ring to the second pipe, in order to prevent relative motion between the second pipe and the swage ring, with the swage ring urged over the second pipe in order to create said seal between the first and second pipes; and wherein said locking means includes a first plurality of one of fine threads, fine grooves, and fine ridges defined on a portion of the pipe outer surface and a second plurality of one of fine threads, fine grooves, and fine threads defined on a portion of the ring inner surface; and wherein the portion of the pipe outer surface on which the locking means is defines has a substantially uniform outer diameter along the length of the second pipe; and wherein both the first and second plurality of one of fine threads, fine grooves, and fine ridges have an arithmetical average roughness that is about several times larger than the arithmetical average roughness of the second pipe outer surface.

21. A pipe fitting adapted to be joined to a pipe comprising:

a coupling body with a body inner surface adapted for receiving a pipe and a body outer surface with a stop flange extending from the body outer surface;

a swage ring which defines a ring inner surface which ring inner surface is urgeable over the body outer surface into contact with the stop flange in order to cause a tooth of the body inner surface to engage and be secured to the pipe to create a seal with the pipe positioned in the coupling body; and a locking means formed in said body outer surface and the ring inner surface for lockingly engaging the swage ring to the coupling body in order to prevent the stop flange from pushing against the swage ring to cause relative motion between said coupling body and the swage ring should the pipe fitting and the pipe be flexed, with the swage ring urged over said coupling body in order to create the seal between the coupling body and the pipe; and wherein said locking means includes a first plurality of one of fine threads, fine grooves, and fine ridges defined n a portion of said body outer surface, and a second plurality of one of fine threads, fine grooves, and fine ridges defines on a portion of the ring inner surface;

wherein the portion of the body outer surface on which the locking means is defined has a substantially uniform outer diameter along the length of the coupling body; and wherein both the first and second plurality of one of fine threads, fine grooves, and fine ridges have an arithmetical average roughness dimension which is substantially smaller than the tooth of the body inner surface which engages the pipe to create said seal.

22. A pipe fitting adapted to be joined to a pipe comprising:

a coupling body with a body inner surface adapted for receiving a pipe and a body outer surface;

a swage ring which defines a ring inner surface, which ring inner surface is urgeable over the body outer surface in order to cause at least part of the body inner surface to engage and be secured to the pipe to create a seal with the pipe positioned in the coupling body; and a locking means formed in said body outer surface and the ring inner surface for lockingly engaging the swage ring to the coupling body, in order to prevent relative motion between said coupling body and said swage ring, with the swage ring urged over said coupling body in order to create said seal between the coupling body and the pipe; and wherein said locking means includes:

a body roughened area defined on a portion of said body outer surface;

a ring roughened area defined on a portion of said ring inner surface; and said body roughened area located on said body outer surface in a position such that with said swage ring urged over said coupling body in order to create said seal with the pipe, said body roughened area lockingly engages said ring roughened area in order to prevent relative motion between said coupling body and said swage ring; and wherein the portion of the body outer surface on which the body roughness area is defined has a substantially uniform outer diameter along the length of the coupling body; and wherein both the body roughened area and the ring roughened area have an arithmetical average roughness which is about several times larger than the arithmetical average roughness of the ring inner surface.

23. The pipe fitting of claim 22 wherein both the body roughened area and the ring roughened area have an arithmetical average roughness which is about two to about eight times larger than the arithmetical average roughness of the ring inner surface.

24. A pipe fitting adapted to be joined to a pipe comprising:

a coupling body with a body outer surface adapted for receiving a pipe with the pipe inner surface located adjacent the body outer surface;

a swage ring which defines a ring inner surface which ring inner surface is urgeable over the pipe outer surface in order to cause at least part of the body outer surface to engage and be secured to the pipe to create a seal with the pipe positioned over the coupling body; and a locking means formed in said pipe outer surface and said ring inner surface for lockingly engaging the swage ring to the pipe, in order to prevent relative motion between the pipe and the swage ring, with the swage ring urged over the pipe in order to create the seal between the pipe and the coupling body; and wherein said locking means includes:

a pipe roughened area provided on a portion of the pipe outer surface;

a ring roughened area defined on a portion of said ring inner surface; and said pipe roughened area located on said pipe outer surface in a position such that with said swage ring urged over the pipe in order to create said seal with said coupling pipe, said pipe roughened area lockingly engages said ring roughened area in order to prevent relative motion between the pipe and said swage ring;

wherein the portion of the pipe outer surface on which the pipe roughened area is defined has a substantially uniform outer diameter along the length of the pipe; and wherein both the pipe roughened area and the ring roughened area have an arithmetical average roughness dimension which is several times larger than the arithmetical average roughness of the ring inner surface.

25. An apparatus for joining the ends of a pair of interfitting pipes wherein an end portion of a first pipe lies within an end portion of a second pipe, with the end portion of the second pipe defining a pipe outer surface, comprising:

- a swage ring which defines a ring inner surface, which ring inner surface is urgeable over the pipe outer surface in order to cause at least part of the first pipe to engage and be secured to the second pipe to create a seal with the first pipe positioned within the second pipe; and
- a locking means formed in said pipe outer surface and said ring inner surface for lockingly engaging the swage ring to the second pipe, in order to prevent relative motion between the second pipe and the swage ring, with the swage ring urged over the second pipe in order to create the seal between the first and second pipes; and
- wherein the locking means includes:
- pipe roughened area provided on a portion of the pipe outer surface;
- a portion of said ring inner surface defining a ring roughened area; and
- said pipe roughened area located on the pipe outer surface in a position such that with said swage ring urged over said second pipe in order to create said seal with said first pipe, said body roughened area lockingly engages said ring roughened area in order to prevent relative motion between the second pipe and said swage ring; and
- wherein the portion of the pipe outer surface on which the pipe roughened are is defined has a substantially uniform outer diameter along the length of the second pipe; and
- wherein both the pipe roughened area and the ring roughened area have an arithmetical average roughness which is about several times larger than the arithmetical average roughness of the ring inner surface.

26. A pipe fitting adapted to be joined to a pipe comprising:

- a coupling body with a body inner surface adapted for receiving a pipe and a body outer surface;
- a swage ring which defines a ring inner surface, which ring inner surface is urgeable over the body outer surface in order to cause at least part of the body inner surface to engage and be secured to the pipe to create a seal with the pipe positioned in the coupling body; and
- a locking means formed in said body outer surface and the ring inner surface for lockingly engaging the swage ring to the coupling body, on order to prevent relative motion between said coupling body and said swage ring, with the swage ring urged over said coupling body in order to create said seal between the coupling body and the pipe; and
- wherein said locking means includes a first plurality of one of fine threads, fine grooves and fine ridges defined on a portion of the body outer surface and a second plurality of one of fine threads, fine grooves, and fine ridges defined on the portion of ring inner surface;
- wherein the portion of the body outer surface on which the locking means is defined has a substantially uniform outer diameter along the length of the coupling body; and
- wherein both the first and second plurality of one of fine threads, fine grooves and fine ridges have an arithmetical average roughness that is about several times larger than the arithmetical average roughness of the ring inner surface.

27. A pipe fitting adapted to be joined to a pipe comprising:

- a coupling body with a body outer surface adapted for receiving a pipe with the pipe inner surface located adjacent the body outer surface;
- a swage ring which defines a ring inner surface which ring inner surface is urgeable over the pipe outer surface in order to cause at least part of the body outer surface to engage and be secured to the pipe to create a seal with the pipe positioned over the coupling body; and
- a locking means formed in said pipe outer surface and said ring inner surface for lockingly engaging the swage ring to the pipe, in order to prevent relative motion between the pipe and the swage ring, with the swage ring urged over the pipe in order to create the seal between the pipe and the coupling body;
- wherein said locking means includes a first plurality of one of fine threads, fine grooves, and fine ridges defined on a portion of the pipe outer surface, and a second plurality of one of fine threads, fine grooves, and fine ridges defined on a portion of the ring inner surface;
- wherein the portion of the pipe outer surface on which the locking means is defined has a substantially uniform outer diameter along the length of the pipe; and
- wherein both the first and second plurality of one of fine threads, fine grooves and fine ridges have an arithmetical average roughness dimension which is about several times larger than the arithmetical average roughness of the ring inner surface.

28. An apparatus for joining the ends of a pair of interfitting pipes wherein an end portion of a first pipe lies within an end portion of a second pipe, with the end portion of the second pipe defining a pipe outer surface, comprising:

- a swage ring which defines a ring inner surface, which ring inner surface is urgeable over the pipe outer surface in order to cause at least part of the first pipe to engage and be secured to the second pipe to create a seal with the first pipe positioned within the second pipe; and
- a locking means formed in said pipe outer surface and said ring inner surface for lockingly engaging the swage ring to the second pipe, in order to prevent relative motion between the second pipe and the swage ring, with the swage ring urged over the second pipe in order to create the seal between the first and second pipes; and
- wherein said locking means includes a first plurality of one of fine threads, fine grooves, and fine ridges defined on a portion of the pipe outer surface and a second plurality of one of fine threads, fine grooves, and fine threads defined on a portion of the ring inner surface; and
- wherein the portion of the pipe outer surface on which the locking means is defined has a substantially uniform outer diameter along the length of the second pipe; and
- wherein both the first and second plurality of one of fine threads, fine grooves, and fine ridges have an arithmetical average roughness that is about several times larger than the arithmetical average roughness of the ring inner surface.

* * * * *